(12) United States Patent
Lo

(10) Patent No.: US 7,121,140 B2
(45) Date of Patent: Oct. 17, 2006

(54) LIQUID QUANTITY SENSING DEVICE

(76) Inventor: Jui-Yang Lo, No. 2, Alley 27, Lane 143, Yuanshan Rd., Junghe City, Taipei (TW)

( * ) Notice: Subject to any disclaimer, the term of this patent is extended or adjusted under 35 U.S.C. 154(b) by 175 days.

(21) Appl. No.: 11/002,313

(22) Filed: Dec. 3, 2004

(65) Prior Publication Data

US 2006/0117847 A1 Jun. 8, 2006

(51) Int. Cl.
  *G01F 23/30* (2006.01)
(52) U.S. Cl. ...................... 73/305; 73/290 R
(58) Field of Classification Search ............ 73/290 R, 73/290 V, 305, 306
See application file for complete search history.

(56) References Cited

U.S. PATENT DOCUMENTS

| | | | | |
|---|---|---|---|---|
| 2,726,296 A | * | 12/1955 | Hanson et al. | 200/84 C |
| 3,307,399 A | * | 3/1967 | Cashman | 73/313 |
| 4,006,637 A | * | 2/1977 | Kinosita | 73/313 |
| 4,771,804 A | * | 9/1988 | Morales | 137/412 |
| 5,035,581 A | * | 7/1991 | McGuire et al. | 417/36 |
| 5,103,673 A | * | 4/1992 | Sawada et al. | 73/313 |
| 5,155,311 A | * | 10/1992 | Utke | 200/84 C |
| 5,224,379 A | * | 7/1993 | Koebernik et al. | 73/308 |
| 5,229,751 A | * | 7/1993 | Chandler et al. | 340/618 |
| 5,699,049 A | * | 12/1997 | Difiore | 340/618 |
| 5,744,701 A | * | 4/1998 | Peterson et al. | 73/49.2 |
| 6,218,949 B1 | * | 4/2001 | Issachar | 340/624 |
| 6,351,993 B1 | * | 3/2002 | Schellenberg | 73/299 |
| 6,935,173 B1 | * | 8/2005 | Stehman et al. | 73/304 C |

* cited by examiner

*Primary Examiner*—Hezron Williams
*Assistant Examiner*—Rodney Frank
(74) *Attorney, Agent, or Firm*—Rosenberg, Klein & Lee

(57) ABSTRACT

A liquid quantity sensing device which can easily and accurately measure liquid quantity stored in a container is disclosed. It utilizes an infrared ray or a supersonic sensing element associated with a float placed in the measuring tube and an electrical circuit board to indicate the measured result on a gage. The information about position of the float detected by the sensing element is inputted into an electrical circuit board as a return signal where it is analyzed and decipherd and then transformed into a value of the liquid quantity to be indicated by a gage. The device is applicable to various sized container by merely adjusting the tube length. An upper and a lower limits of liquid level may be prescribed, a warning signal can be obtained if the liquid level exceeds either limit.

8 Claims, 4 Drawing Sheets

LIQUID QUANTITY SENSING DEVICE

BACKGROUND OF THE INVENTION

1. Field of the Invention

The present invention relates to a liquid quantity sensing device, and more particularly, to a contactorless and frictionless liquid quantity sensing device which has the merits of excellent durability, high precision, simple structure and low production cost.

2. Description of the Prior Art

FIG. 1 shows a schematic view of a liquid quantity sensing device which was disclosed by the inventor of the present invention patented in Sep. 18, 2001 in U.S. (Pat. No. 6,289,731). This sensing device for liquid quantity includes an inner tube 11, a coil 12, an outer tube 13, a magnetized float 14, a base 15, and a cap 16. The coil 12 is wound around the inner tube 11, and the magnetized float 14 is contained in the inner tube 11. the outer tube 13 is sleeved on the inner tube 11. the cap 16 is screwed on the inner tube 11 while the base 15 is attached to the bottom of the inner tube 11. Several seepage pores 151 are provided on the base 15 so as to allow liquid to seep in the inner tube 11. The top and bottom ends of the outer tube 13 are sealed with binder so as to protect the coil 12 wound around the inner tube 11. With this construction the liquid quantity can be measured by change of inductance in the coil 12 with respect to the position of the float 14 in the inner tube 11 corresponding to change of liquid level, and the amount of change of inductance is transformed by an electrical circuit into corresponding liquid quantity which is indicated on a page 17 connected outside of the sensing device. Soon the inventor has found out that his previous invention has following shortcomings:

1. The sensing device is composed of too many essential components which result in a complicated overall structure and an increased production cost.

2. It requires a tedious procedure to wind the coil around the inner tube, especially for a longer inner tube.

3. It is difficult to keep a precise clearance between the magnetized float and the inner tube to obtain an accurate measurement result.

For these defects noticeable on the inventor's prior invention, an improvement is seriously required.

The inventor has once more dedicated great efforts for years to studying and improving these defects and come up with an improved liquid quantity sensing device as provided in this invention to eliminate the defects mentioned above.

SUMMARY OF THE INVENTION

The main object of the present invention is to provide a liquid quantity sensing device which can accurately measure liquid quantity in a liquid container by utilizing an infrared ray or supersonic sensing element associated with a float and an electrical circuit board to indicate the measured data on a gage according to the signal outputted from the electrical circuit board.

Another object of the present invention is to provide a liquid quantity sensing device which is applicable to the liquid container of any size by adjusting the length of its measuring tube.

Still another object of the present invention is to provide a liquid quantity sensing device which is simply constructed without comprising too many component parts so as to facilitate fabrication and assembly with low cost.

To achieve these and other objects mentioned above, the liquid quantity sensing device provided by this invention is composed of a tube, a float, a base, a case with its lid, and an electric circuit board. The tube has several pores opened on its top for balancing the liquid height inside and outside the tube. The float is floating on the liquid surface in the tube. The base is engaged to the bottom of the tube and has a liquid inlet. The case covers on top of the tube with hooks and is screwed to the liquid container with several screw bolts and taped holes provided around its bottom flange edge. An electrical circuit board together with a sensing element equipped beneath it is accommodated in the inner space of the case and the sensing element (either infrared ray or supersonic) is emerge out of a sensor aperture opened at the bottom center of the case. The lid is covered on the case closely in sealed state thereby completing the structure of the liquid quantity sensing device. In measuring the liquid quantity in a liquid container, the information of liquid level in the tube is fed by the float as a return signal in response to the radiation of the infrared ray or supersonic wave from the sensor element. The retrun signal is received, analyzed and deciphered by the specially designed electrical circuit and is transformed into resultant data of liquid quantity to be indicated on a gage. Meanwhile, an upper and a lower limits of liquid level can be prescribed on the tube, and a warning signal can be obtained in the form of light, buzzer sound or voice if the liquid level exceeds either limit.

DETAILED DESCRIPTION OF THE PREFERRED EMBODIMENT

Now, the various features and advantage of the present invention will be fully understood and appreciated from the following detailed description of the preferred embodiment in conjunction with the above drawings.

Figure 1:
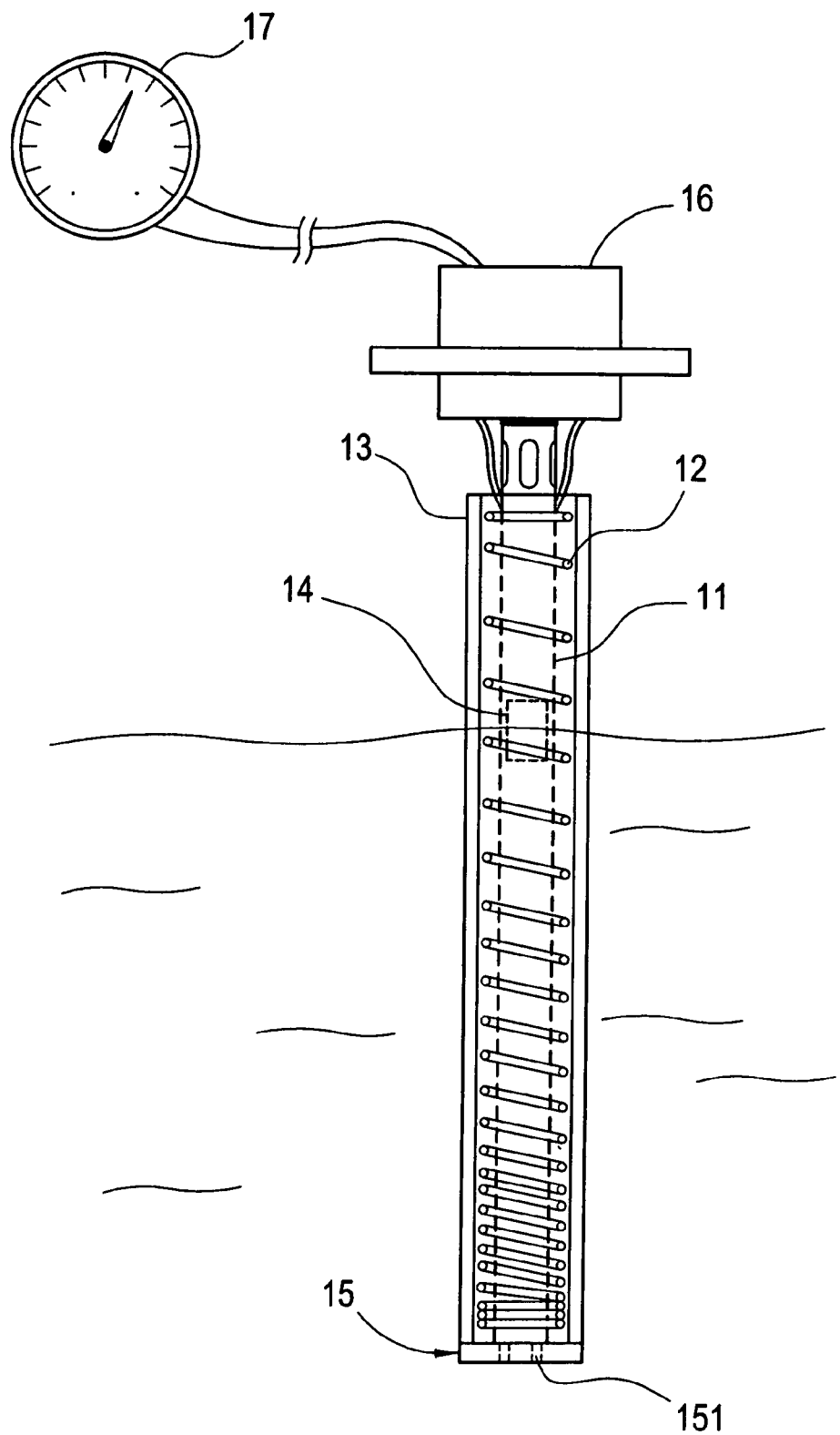
FIG. 1 is a schematic view of the cited invention.
Figure 2:
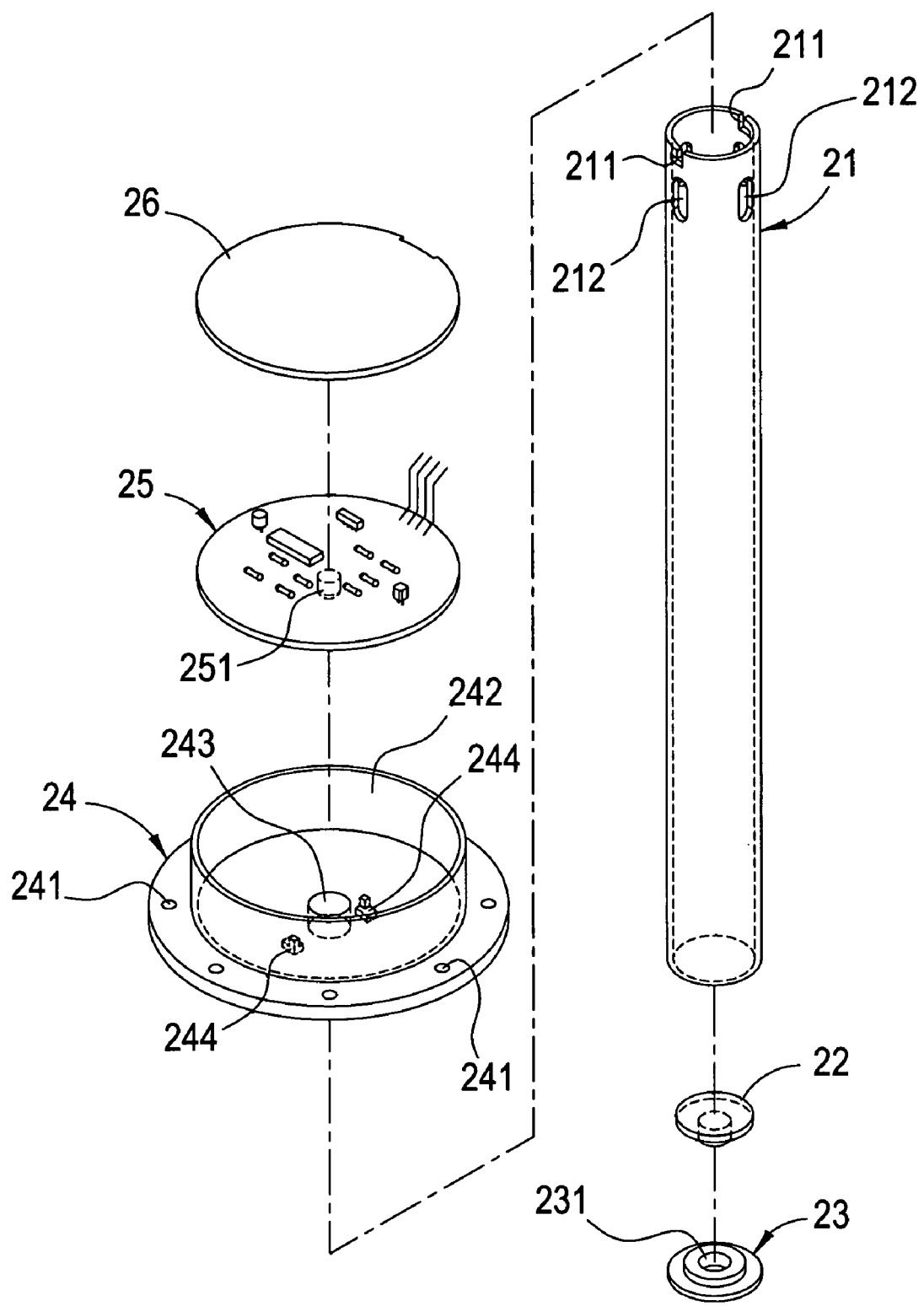
FIG. 2 is a three dimensional exploded view of the present invention.
Figure 3:
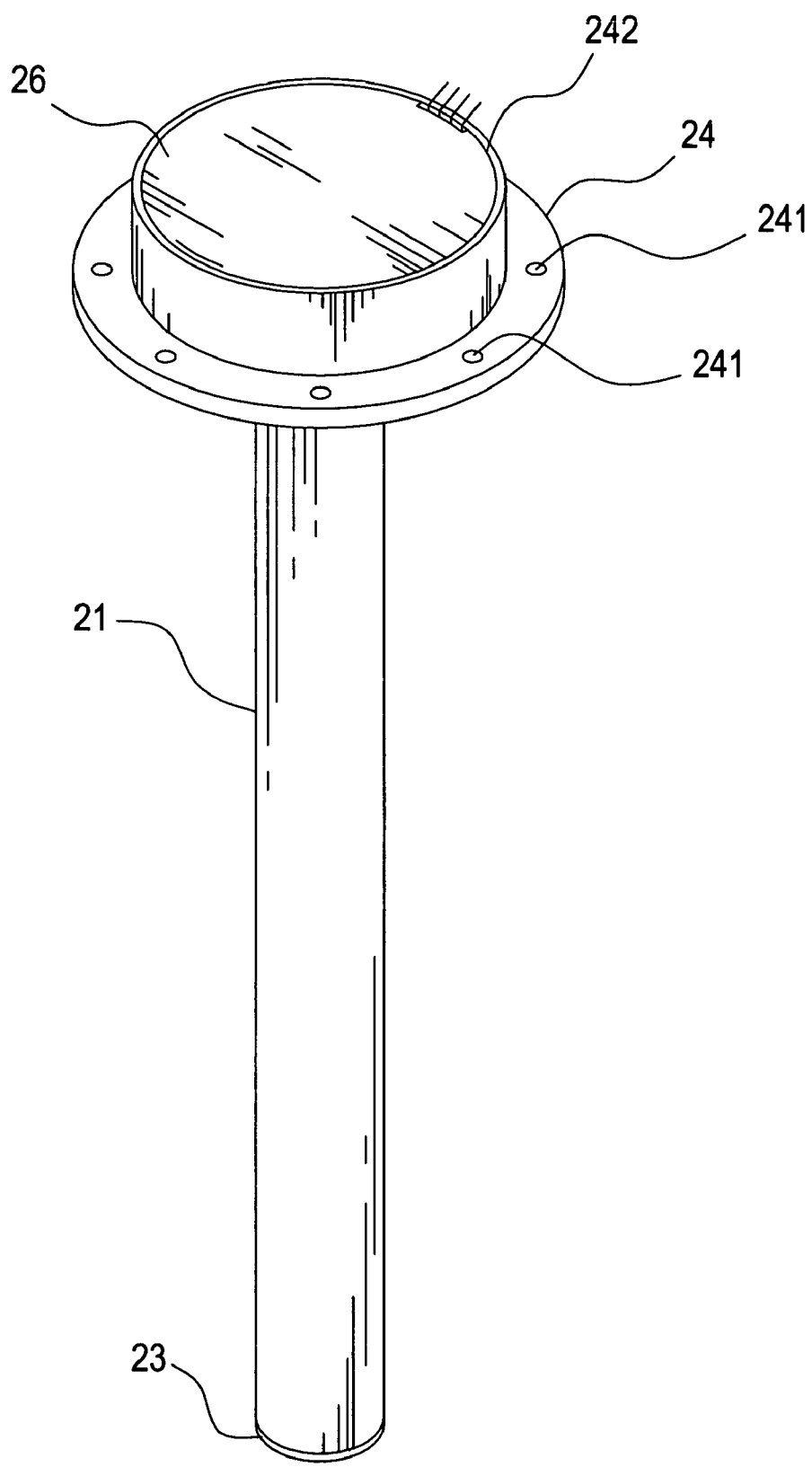
FIG. 3 is an assembly view of the present invention.

Referring to FIGS. 2 and 3, the liquid quantity sensing device of the present invention comprises a tube 21, a float 22, a base 23, a case 24, an electrical circuit board 25, and a lid 26.

The tube 21 is a hollow tube with more than one hook eyes 211 formed along its top edge, and corresponding number of pores 212 are opened on the tube 21 under the hook eyes 211 for balancing the liquid level inside and outside of the tube 21. the length of the tube 21 can be adjusted to match the depth of the liquid container whose liquid quantity is to be measured.

The float 22, made of common material and thin in vertical direction, can float on the surface of liquid in the tube 21.

The base 23 with a central liquid inlet 231 for introducing the outer liquid into the tube 21, is coupled to the bottom of the tube 21.

The case 24 has several screw holes 241 around its bottom flange edge to engage with the liquid container by screwing, and a sensor aperture 243 is opened on the bottom center of its recessed accommodation cavity 242. the equal number of hooks 244 to that of the hook eyes 211 of the tube 21 is formed around the bottom edge of the case 24 for hooking the case 24 onto the tube 21 rigidly.

The electrical circuit board 25 together with an infrared ray sensor element, a supersonic sensor element, or the like 251 attached beneath its bottom, is settled in the accommodation cavity 242 of the case 24 in the manner emerging the sensor element 251 out of the aperture 243.

The lid 26 covers on the case 24 to keep its accommodation cavity 242 in sealed stage. The lid 26 may be accompanied with a terminal block to communicate with incoming signals with its terminals connected to external signal lines.

The liquid quantity sensing device of the present invention is constructed as described above.

Figure 4:
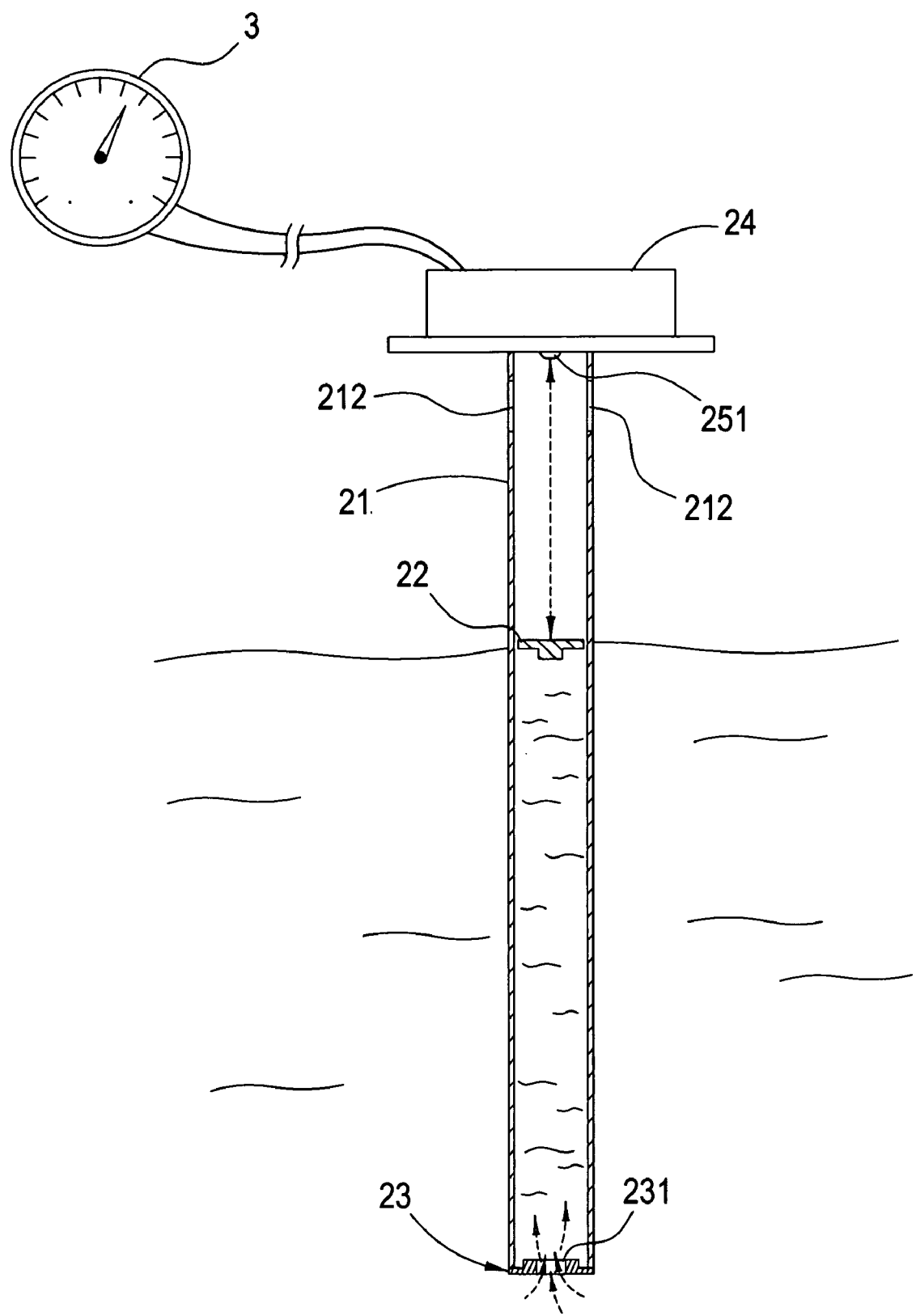
FIG. 4 is an illustrative view showing how to operate the present invention.

To understand how to operate the liquid quantity sensing device of the present invention, reference should be made to FIG. 4. When the sensing device is installed properly ready for service, the liquid in the liquid container will enter the tube 21 through liquid inlet 231 formed on the base 23 and the float 22 changes its position in the tube 21 with respect to the variation of the liquid level. At this moment being radiated by the light ray from the sensing element 251, the float 22 delivers a return signal informing as to the variation of the liquid quantity in response, this return signal is analyzed and deciphered in the specially designed electrical circuit board 25 and is then transformed to a value representing the liquid quantity and indicated by an externally equipped gage 3. Besides, a prescribed upper liquid level and lower liquid level may be marked on the tube 21 (not shown) depending on size of the container through calculation and analyzation of the electrical circuit board 25. a warning signal can be obtained according to the indication of the gage 3 in the form of light, buzzer sound or voice if the liquid level exceeds either prescribed limit.

It emerges from the above description that the liquid quantity sensing device of the present invention has several noteworthy advantages compared to the product of the cited invention namely:

1. It is able to measure the liquid quantity accurately by collaborated performance of infrared ray or supersonic wave sensing element and the float.

2. The response signal from the float can be transformed into a measured value of liquid quantity indicated on a gage conveniently through a specially designed electrical circuit.

3. The sensing device is applicable to measure quantity of liquid stored in various sized container by merely adjusting the tube length.

4. An upper and a lower limits of liquid level can be prescribed and marked on the tube, and a warning signal can be obtained in the form of light, buzzer sound or voice in the case the liquid level exceeds either limit.

5. The structure of the device is shock resistant, simply constructed, easy to fabricated and assemble with low cost.

Many changes and modifications in the above described embodiment of the invention can, of course, be carried out without departing form the scope thereof. Accordingly, to promote the progress in the science and the useful arts, the invention is disclosed and is intended to be limited only by the scope of the appended claims.

What is claimed is:

1. A liquid quantity sensing device comprising:
    a hollow tube having more than one hook eyes formed along its top edge, and corresponding number of pores opened on said tube under said hook eyes;
    a float floating on the liquid in said tube, and movable up and down in accordance with the change of liquid level;
    a base having a central liquid inlet and being engage to the bottom of said tube;
    a case having several screw holes around its flange edge and a recessed accommodation cavity, wherein a sensor aperture is opened at the bottom center of said accommodation cavity, and the equal number of hooks to that of said hook eyes on said tube is formed around the bottom edge of said case;
    an electrical circuit board together with a sensor element attached beneath its bottom, wherein said electrical circuit board is settled in said accommodation cavity of said case in the manner emerging said sensor element out of said aperture; and
    a lid covering on said case to keep said accommodation cavity in sealed state;
    said liquid quantity sensing device is constructed as such.

2. The liquid quantity sensing device as in claim 1, wherein the length of said tube can be adjusted to match the depth of the container to measure its stored liquid quantity.

3. The liquid quantity sensing device as in claim 1, wherein said case is conjoined firmly to said tube by hook engagement.

4. The liquid quantity sensing device as in claim 1, wherein said sensing element is an infrared ray sensing element.

5. The liquid quantity sensing device as in claim 1, wherein said sensing element is a supersonic sensing element.

6. The liquid quantity sensing device as in claim 1, wherein said lid is accompanied with a terminal block to communicate with incoming signals with its terminals connected to external signal wires.

7. The liquid quantity sensing device as in claim 1, wherein a prescribed upper liquid level and lower liquid level are marked on said tube through calculation and analyzation made by said electrical circuit board, and a warning signal can be obtained in various forms from alarm devices in the case the liquid level exceeds either prescribed limit.

8. The liquid quantity sensing device as in claim 7, wherein said upper and lower liquid levels are prescribed depending on the container's size.

\* \* \* \* \*